Aug. 22, 1933.    W. H. MASON    1,923,549
ARTICLE HANDLING SYSTEM
Original Filed Nov. 30, 1926    4 Sheets—Sheet 1
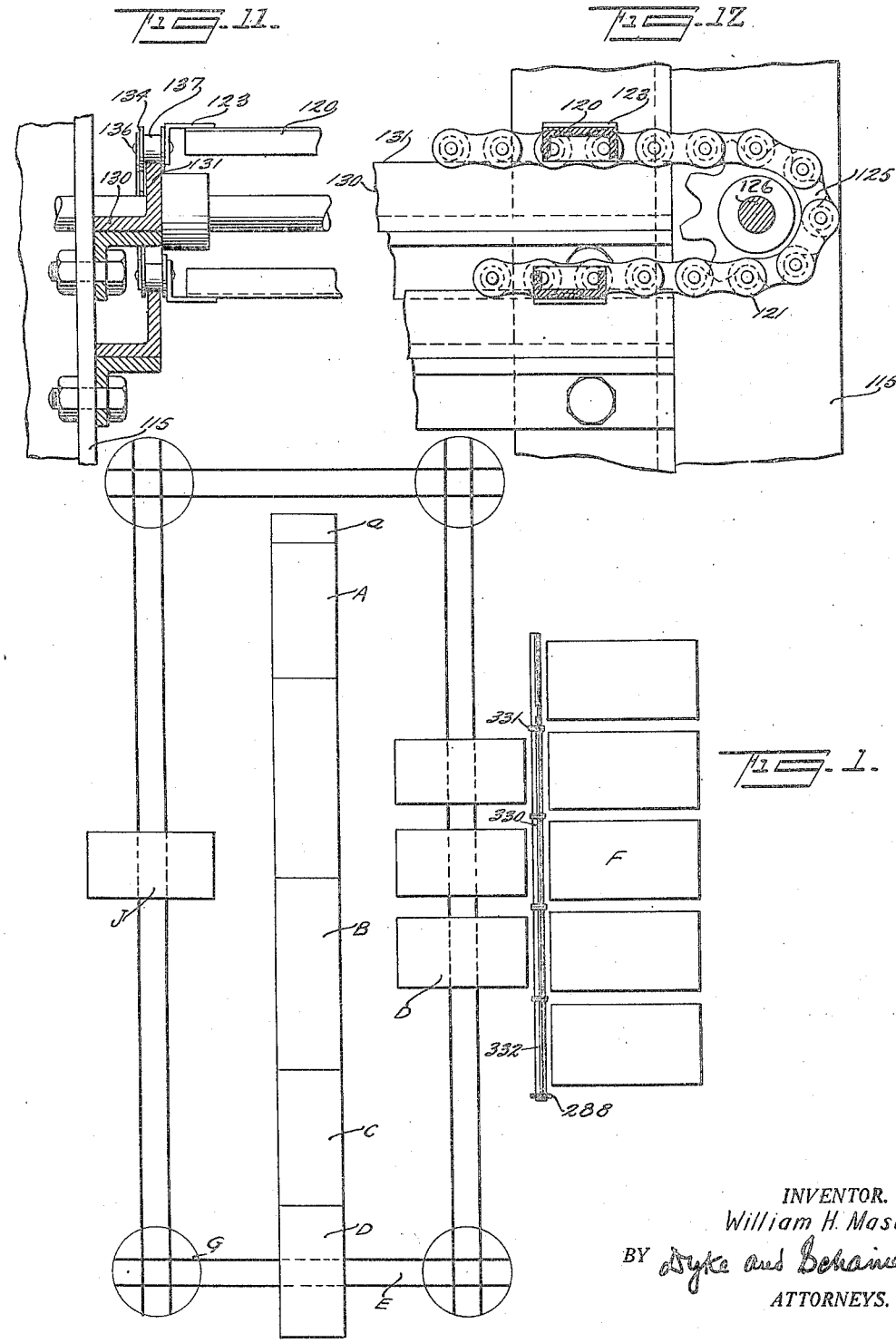
INVENTOR.
William H. Mason.
BY Dyke and Behainus
ATTORNEYS.

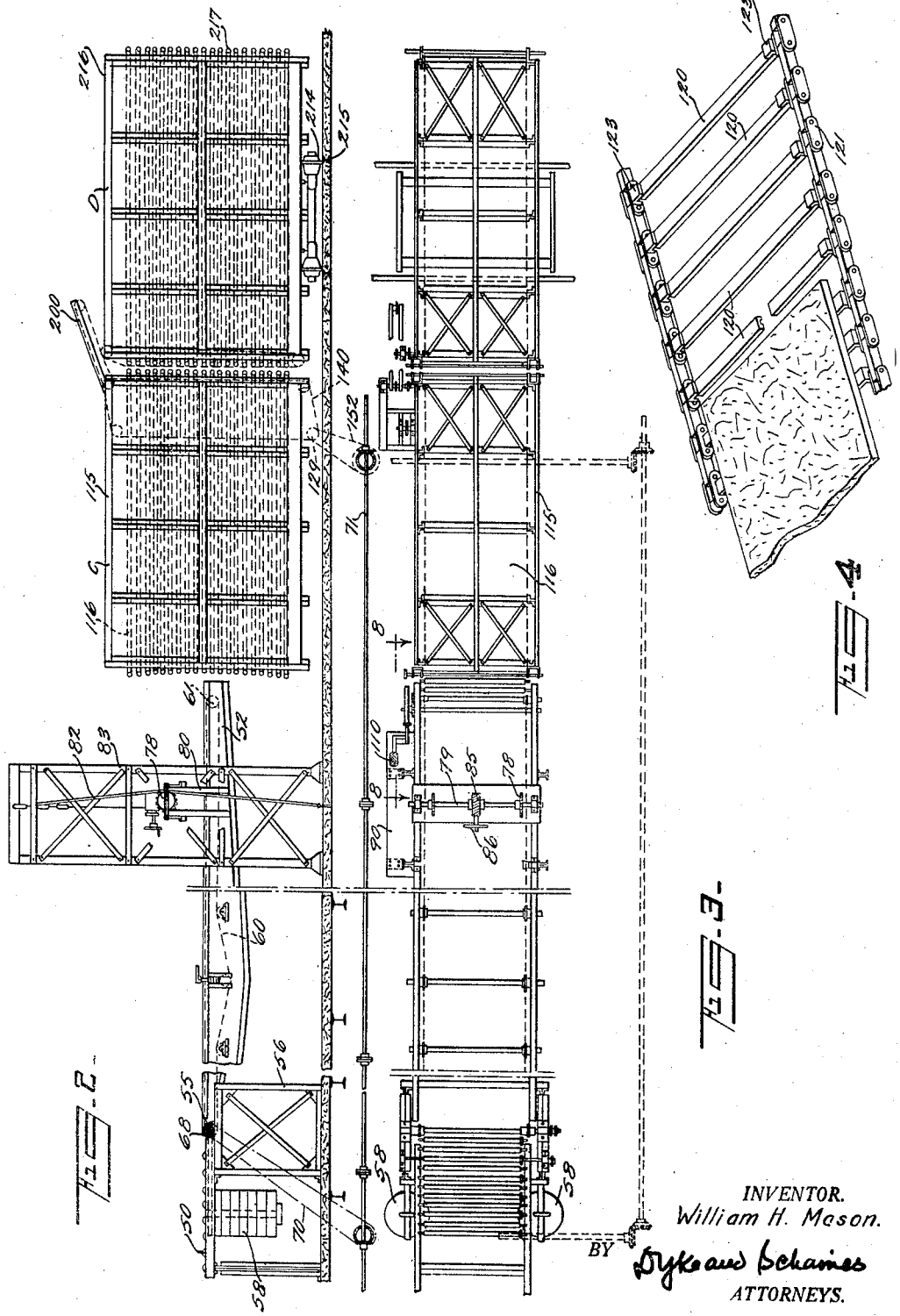

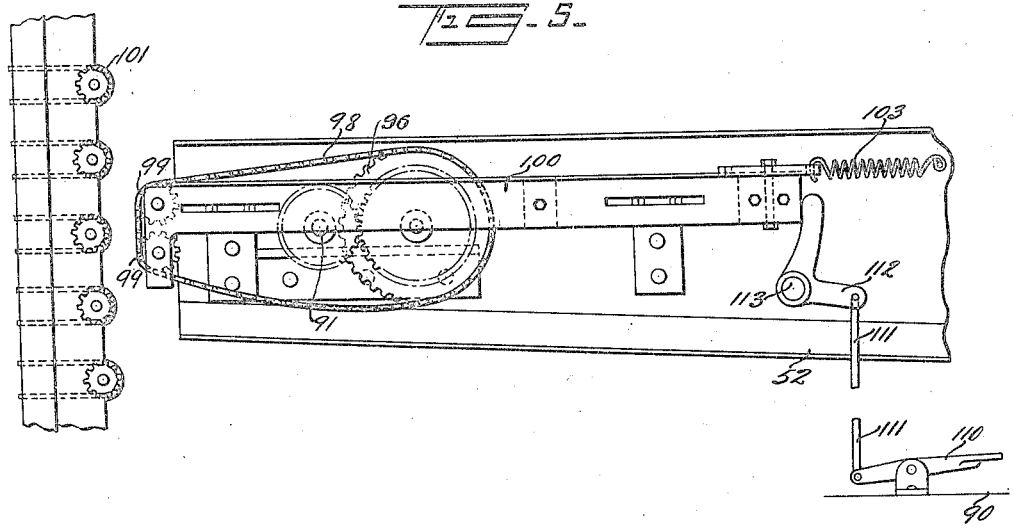
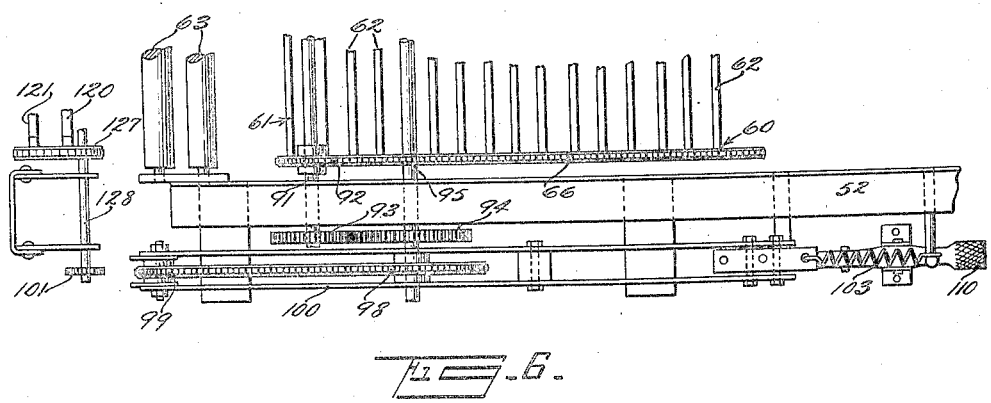

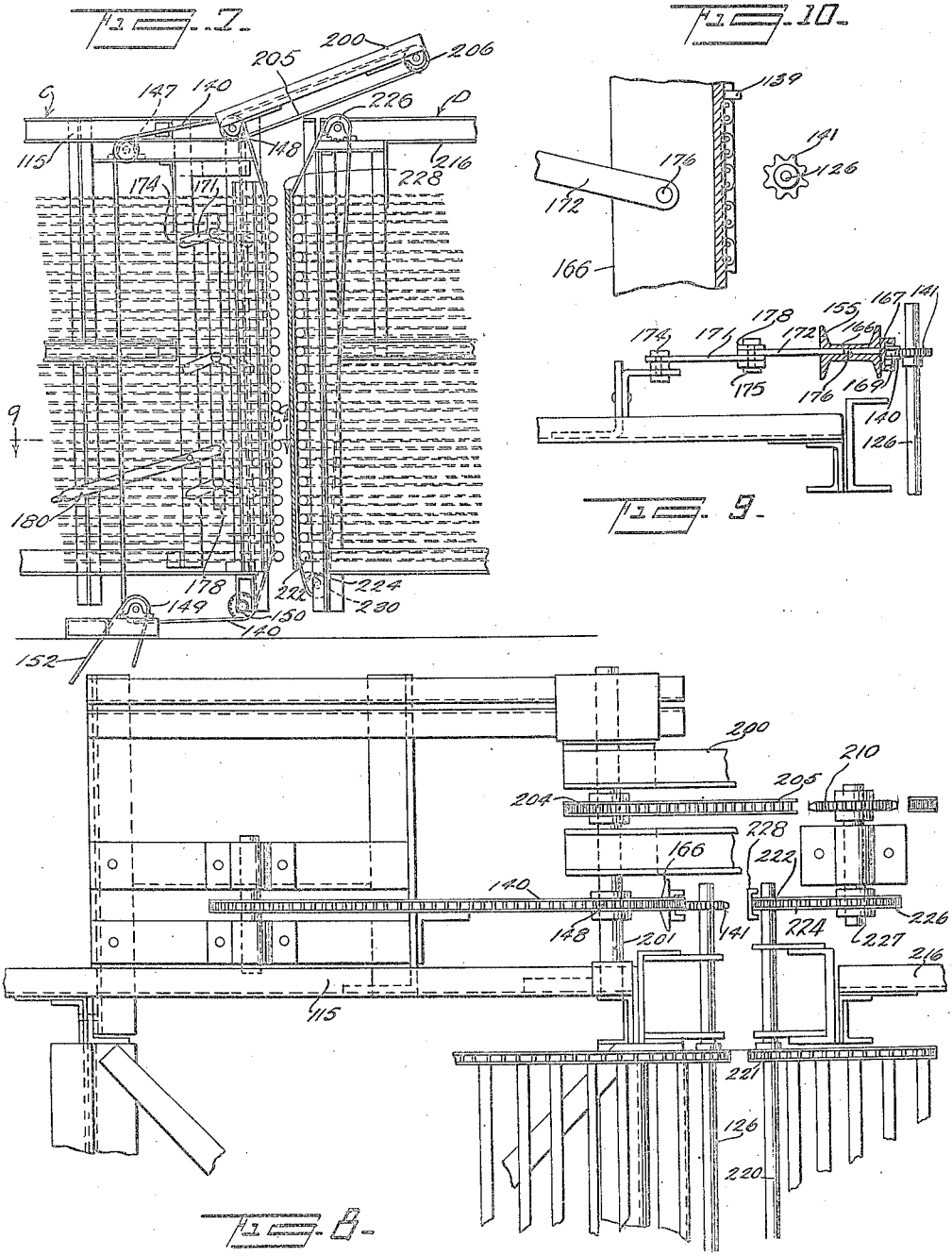

Patented Aug. 22, 1933

1,923,549

UNITED STATES PATENT OFFICE 1,923,549

ARTICLE HANDLING SYSTEM

William H. Mason, Laurel, Miss., assignor to Masonite Corporation, Laurel, Miss., a Corporation of Delaware Original application November 30, 1926, Serial No. 151,809. Divided and this application May 20, 1930. Serial No. 454,060

13 Claims. (Cl. 198—20)

This application is a division of Patent No. 1,767,539 granted June 24, 1930 upon application Serial No. 151,809, filed November 30, 1926 and relates to a system or apparatus for the handling of articles during their process of manufacture, for example, composition boards, sheets, plates, strips and the like.

One object of my invention is to provide an improved apparatus by which said articles or bodies may be produced efficiently, economically, continuously and in as large quantities as desired.

By the use of my improved system, none of the apparatus used is permitted to remain idle during the manufacturing operations and such apparatus is employed at its maximum efficiency. The manual labor required for the manufacturing operations may be easily performed and but few operators are necessary for the performance of these operations.

The particular apparatus disclosed in the present application, while capable of use with articles of various kinds, is particularly adapted for the handling of soft wet sheets, composed in whole or in part of felted fibrous material such as cellulose, wood fibres, and the like, to form therefrom boards adapted for use as wall boards, artificial lumber or similar construction elements. The process of manufacture includes briefly the formation of sheets of fibrous material from a liquid pulp mass; the partial compression of the sheet and the cutting of it into desired lengths; the transfer of the cut pieces to a receiving device for holding a considerable number of such pieces in superposed relation.

In carrying out these operations the raw fibrous material from which the boards are made is divided or disintegrated so as to separate the fibres. I preferably form the divided material by exploding wood in the manner described in my United States Patent 1,578,609 granted March 30, 1926. I mix this material with water to form a liquid pulp mass, which is then run onto the traveling screen of a Fourdrinier machine which forms a mass, in a manner well known in the art, into a continuous sheet with the fibres felted or matted together so that the material when finally dried is self-sustaining. As the sheet moves through the machine, a considerable amount of the water of the pulp mass is removed by draining or suction. The sheet in passing through the machine is squeezed between pressure rollers which serve to compress the material of the sheet increasing its density and strength. After the passing of the pressure roll the partly compressed sheet is moved by a cutting machine which divides the sheet transversely into desired lengths. These cut pieces or partly prepared boards as they are delivered from the Fourdrinier machine are received on a specially constructed carrier. This carrier may be tilted, that is, the outer end of the carrier is movable up and down so that it may be brought into position to register with any one of the endless conveyors on the receiving rack. In operation a board travels over the tilting carrier and is received by one of the conveyors on the receiving rack. The operator then shifts the tilting carrier so that the next board will be received by another of the conveyors on the receiving rack. In this manner the receiving rack can be filled with boards.

As previously stated the boards at the time they leave the Fourdrinier machine are soft and the felting is apt to be broken unless the boards are very carefully handled. The particular means which I employ consisting of the tilting carrier and the conveyors on the receiving rack permits these boards to be transferred without danger of injury.

Other features of my invention, including particularly certain novel details of construction of the apparatus employed, will appear from the following description taken in connection with the accompanying drawings wherein Figure 1 is a diagrammatic plan view of the entire plant for producing the finished boards;

Fig. 2 is a side elevation showing the table rolls of the Fourdrinier machine and showing the tilting or tipple feed, the stationary receiving rack and a truck or movable rack;

Fig. 3 is a plan view of the structure shown in Fig. 2;

Fig. 4 is a detailed view of one form of board carrier which may be used on the stationary and movable racks;

Fig. 5 is a detail of means for driving the sprockets of the stationary rack from the tilting feed looking in the direction of the arrows in Fig. 3;

Fig. 6 is a plan view of the structure shown in Fig. 5;

Fig. 7 is a detail of means for driving all of the movable rack conveyors from the stationary racks so as to transfer the boards from the stationary rack to the movable rack all at once;

Fig. 8 is a plan view of the structure shown in Fig. 7;

Fig. 9 is a section on a line 9—9 of Fig. 7;

Fig. 10 is an enlarged detail showing a toggle mechanism adapted to move a chain into the path of sprocket wheels on the racks for the purpose of driving all the conveyors of the rack at once.

Figs. 11 and 12 are details of sprocket mounting and conveyor.

The Fourdrinier machine A shown diagrammatically in Fig. 1 receives liquid pulp at one end (a) and delivers the partly formed soft boards to the tilting carrier or tipple B at the opposite end. The boards delivered by the carrier B are received by the stationary rack C which in turn delivers them to the truck or movable rack D. The truck is then moved along the track E to one of the presses F, suitable turn-tables G being provided for turning the truck at the corners of the track. The press F is charged from the truck, leaving the truck empty and ready to receive a load of pressed and dried boards from one of the other presses. These latter boards when transferred to the truck are permitted to remain on the truck carrier until they are cooled, the truck being shifted to an appropriate place on the track where it remains during the cooling. When the boards are cooled the truck is unloaded at an appropriate place such as J and the boards which can then be handled without danger of injury, may be moved to warehouse, shipped or otherwise disposed of. The truck after final unloading completes the circuit of its travel back to the stationary rack where it is ready to receive a new load of soft boards.

As shown in Fig. 1, I employ five hydraulic presses which take care of the boards from the single Fourdrinier machine A. The number of trucks employed will generally be double the number of presses, that is, ten in the case of the plant shown in Fig. 1.

I will now describe in more detail the particular construction and operation of the various devices illustrated diagrammatically in Figure 1.

The tipple

The continuous sheet of material produced by the Fourdrinier is cut into boards by a suitable cutter and such boards pass over a series of driven table rolls 50 to the tipple or tilting carrier B which is illustrated at the left hand of Figs. 5 and 6. The function of this carrier as previously explained is to move the boards from the cutting machine to one or another of the conveyors of the stationary rack C. The tipple B consists of a frame 52 which is pivotally mounted at 55 on a supporting structure 56 and is suitably counterbalanced at 58 so that the tipple can be easily swung from one position to another. The frame 52 carries an endless carrier 60 which extends from the rear end of the tipple to the point 61, a short distance to the rear of the forward end of the tipple. This carrier consists of a series of slats or boards 62 supported by chains 66 as shown in Fig. 6. Chains 66 are driven from sprockets 68 at the rear of the tipple. Sprockets 68 are in turn driven by a chain 70 from the main drive shaft 71 of the Fourdrinier machine. The boards after leaving the carrier 60 and before passing on to the stationary rack pass over a series of gravity rolls 63 supported at the forward end of the tipple. For a purpose which will be more fully explained hereafter the connection between the main drive shaft of the Fourdrinier machine and the carrier 60 and the tipple is such that the carrier 60 is driven at a greater speed than the table rolls 50.

In order to move the outer end of the tipple B up or down so as to cause it to deliver boards to any one of the stationary rack conveyors, I provide the tipple with a pair of sprocket wheels 78 mounted on a shaft 79 which is journaled in supporting members 80 that are secured and extend upwardly from the side of the tipple frame 52.

Engaging each of the sprocket wheels 78 is a chain 82 which is secured at its lower end to the floor beneath the tipple and its upper end to the top of a stationary frame 83, above the tipple carrier. The tipple is tilted from one position to another by turning the sprockets 78 and for this purpose I provide the shaft 79 with a worm drive 85 which may be actuated by a hand wheel 86 within reach of an operator who stands on a platform 90 carried by and movable with the tipple frame 52. When the tipple is moved to a position in which its carrier registers with one of the conveyors of the stationary rack, a spring latch moves into one of a series of recesses formed in the side of the stationary frame 83 and in this manner insures the proper positioning of the tipple relative to the conveyor on the stationary rack.

The conveyors on the stationary rack are normally idle and operate only when connected by the operator to a driving means. When the tipple is about to deliver a board to one of the conveyors of the stationary rack the operator connects an operating means located on the tipple with this particular conveyor on the stationary rack so as to actuate the conveyor to receive the board. This operating means comprises a shaft 91 driven from the chain 66 of the tipple carrier 60 through sprocket wheel 92. (See Fig. 6). Shaft 91 carries at its outer end a gear 93 which meshes with the gear 94 fixed to a counter shaft 95. Shaft 95 carries at its outer end a sprocket wheel 96 which serves to move a sprocket chain 98 that passes over the sprocket wheel 96 and over two toothed guide rolls 99 mounted at the extreme front end of the tipple on a frame 100. Frame 100 is slidable forward and backward on the tipple frame 52. When frame 100 is moved to extreme forward position, the chain between the toothed rolls 99 engages one of a number of toothed wheels 101 on the stationary or receiving rack C; the particular toothed wheel so engaged serving to actuate that one of the conveyors of the receiving rack which is to receive the board from the tipple. As the chain 98 is being continuously driven from the tipple carrier, as soon as the chain is brought into engagement with the toothed wheel 101, the wheel rotates and drives the proper conveyor to receive the board from the tipple.

The frame 100 which carries the rolls 99, is normally held in its rear or retracted position by a spring 103, one end of which is secured to the frame 52 of the tipple. For the purpose of advancing the frame 100, I provide a pedal 110 mounted on the tipple platform 90 within convenient reach of the operator. Pedal 110 is connected by a link 111 to a bell crank lever 112 pivoted at 113 to the tipple frame 52. The upper end of the bell crank lever 112 engages the rear end of the slidable frame 100 and when the pedal 110 is pressed, moves the frame 100 forward. Figures 5 and 6 show the frame 100 in its retracted position, the operating chain 98 sagging between the sprocket 96 and the rolls 99. As the rolls 99 are moved forward the slack in the chain 98 is taken up and the chain permits the rolls 99 to advance.

The stationary rack

Figures 2 and 3 show the stationary rack C located between the movable rack D and the tipple B. The stationary rack consists of a fixed framework 115 which supports a number of endless conveyors 116. Figure 2 shows twenty stationary rack conveyors located one above the other. The detail construction of these conveyors is shown in Figs. 4, 11 and 12. Each consists of a series of transverse supporting members or bars 120 extending between and carried by two endless chains 121. The bars 120 are secured to the chain links by angle brackets 123. Each of the chains is carried by a front sprocket wheel 125 mounted on a transverse shaft 126 journaled in the framework 115 and by a similar rear sprocket wheel 127 mounted on a shaft 128 likewise journaled in the framework 115. For the purpose of supporting the conveyor chains along their lengths I provide angle members 130 secured along the side of the framework 115. Each of these members 130 is formed with an upward extending portion 131 on the top of which the conveyor chain rides. The chain is formed of opposite side links 134 and transverse members connecting the links, each member comprising a bolt 136 and a sleeve 137 loosely mounted on the bolt. The portion 131 engages the bottoms of the sleeves and as the chain moves the sleeves roll on the top of the portion 131. The connecting side links 134 of the chain extend a short distance down on opposite sides of the portion 131 of the supporting member 130 as shown in Fig. 11 and it will be seen that by this construction the chain is not only supported along its length but is also held against lateral displacement by engagement of the chain links with the sides of the portion 131. The conveyors 116 as described are not only very compact but are so constructed that they will support the boards evenly over their entire area and will move the boards without injuring them. It may be remarked at this time that the conveyors on the movable rack are of substantially the same construction as the conveyors on the stationary rack which have just been described.

When one of the conveyors on the stationary rack is to receive a board from the tipple B, the operator presses the foot lever 110 on the platform 90 and causes the moving chain 98 to engage the toothed wheel 101 as previously stated. This wheel is mounted on the shaft 128, above described, and when shaft 128 is rotated it serves to actuate the particular conveyor selected.

When the boards are unloaded from the stationary rack to the truck or movable rack, all of the conveyors on the stationary rack and on the movable rack are operated at once. The operation of all the conveyors on the stationary rack is effected by engagement of a moving endless chain 140 with toothed wheels 141 mounted on shafts 126, which shafts carry the conveyor sprocket chains 125. The chain 140 passes over two upper sprockets 147 and 148 at the top of the frame 115 and under two sprockets 149 and 150 at the bottom of the frame 115 (see Fig. 7). Sprocket 149 is driven from the main drive 71 of the Fourdrinier machine through a chain 152. The chain 140 extends up the front of the stationary rack, back of the toothed wheels 141, where it is engaged by a movable guide 155. Figures 9 and 10 show the chain 140 and guide 155. The guide 155 comprises a bar 166 which extends from the top to bottom of the stationary rack. Secured along the front of the bar 166 is a channel member 167, the sides of which project forwardly toward the toothed wheel 141. The bottom of the channel of the member 167 is formed with a forwardly projecting rib 169 which engages the chain between opposite side links of the chain and serves to prevent the chain from moving laterally. The chain is held against the guide by clips located at the top and bottom of the guide.

The guide 155 is employed to move the chain 140 forward into engagement with the toothed wheels 141 when it is desired to move all the conveyors of the stationary rack simultaneously. For this purpose the guide 155 is mounted on the framework 115 of the stationary rack so that it can be moved forward and backward by means of toggles 170 each formed of links 171 and 172; the link 171 being pivoted at 174 to the framework 115 and at 175 to the link 172 and the link 172 being pivoted at 176 to the guide 155. A bar 178 connects all of the pivotal points 175 of the toggles. To move the chain 140 into engagement with the toothed wheels 141, the toggles 170 are straightened by moving the bar 178 downwardly. The bar is moved by a pivoted handle 180 (see Fig. 7) conveniently located at the side of the rack.

While I have disclosed the means for operating all of the stationary rack conveyors as consisting of a single chain adapted to be moved into engagement with and operate a toothed wheel keyed at one end of each of the shafts 126, it will be understood that I may if desired employ two chains located at opposite sides of the stationary rack and provide each of the shafts 126 with two toothed wheels at opposite ends for cooperation with the two chains. In this case the single handle 180 will serve to move both of the chains into engagement with their respective toothed wheels.

When the conveyors on the stationary rack are actuated as just described, to cause the boards to be delivered simultaneously on to the movable rack, the conveyors on the movable rack are also actuated simultaneously to receive the boards. The conveyors on the movable rack are operated from the stationary rack by a means shown in detail in Figure 8 wherein 200 represents a swinging frame which is loosely mounted on a shaft 201 and which extends over the top of the rear end of the movable rack when the movable rack is in its loading position. Frame 200 is adapted to occupy two positions, a raised or inoperative position and a lowered or operative position. The frame 200 is shown in its raised position in Figure 7 and in its lowered position in Figure 2. Shaft 201 on which the frame 200 swings is journaled in ball bearings in the framework 115 of the stationary rack and has keyed thereto the sprocket wheel 148 which is driven by means of the chain 140 as previously stated. Also keyed to the shaft 201 is a second sprocket wheel 204 over which passes an endless chain 205. Chain 205 extends forward of the sprocket 204 and around a supporting sprocket 206 journaled in ball bearings in the forward end of swinging frame 200. The chain 205, due to its connection with the driving chain through the sprocket 204, shaft 201 and sprocket 148, is constantly moving and when it is desired to operate the conveyors on the movable rack, the frame 200 is swung from its upper to lower position, which causes the chain 205 to engage a sprocket wheel 210 and through this sprocket wheel to operate all of the conveyors on the movable rack. Any suitable means may be employed for swinging the frame 200 from one of its positions to the other. In practice I prefer to swing the frame 200 by the same means which moves the chain 140 on the stationary rack into engagement with the toothed wheels 141, namely the handle 180. Handle 180 may be connected in any suitable manner with the swinging frame 200 so that when the handle is moved to straighten the toggles 170 and cause engagement of the chain 140 with the toothed wheel 141, the frame 200 is swung downward and chain 205 engages sprocket 210. In this manner all of the conveyors of the stationary rack are operated to discharge the boards and all of the conveyors of the movable rack are simultaneously operated to receive the boards discharged.

*The movable rack*

The movable rack D is supported on wheels 214 mounted to run on rails 215 of the track E. It comprises a framework 216 which carries the endless conveyors 217, twenty in number. As these conveyors are similar in construction and mounting to the conveyors of the stationary rack a detailed description of them need not be given. The rear shafts of the movable rack conveyors on which the conveyor chain sprockets 221 are mounted, have keyed thereto, at their outer ends driving wheels, 222, which are engaged by an endless operating chain 224. The chain 224 is kept constantly in engagement with the wheels 222 by a fixed guide 228 similar in construction to the guide 155 on the stationary rack. Chain 224 is operated from a sprocket 226 shown in Fig. 8, sprocket 226 is keyed to a shaft 227 which is journaled in ball bearings mounted on the movable rack framework 216. The sprocket 210 which drives all of the movable rack conveyors is keyed to the outer end of a shaft 227. Chain 224 at its lower end passes under a sprocket 230 mounted in the lower part of frame 216.

*Transfer of boards from the Fourdrinier machine to the movable rack*

As previously stated the transfer of the boards from the Fourdrinier machine to the movable rack involves the loading with boards, of the conveyors on the stationary rack and the simultaneous discharge of all these boards to the movable rack. Let it be assumed that the stationary rack is loaded with boards and the operator has just moved the handle 180 to cause all of the conveyors of the stationary rack and of the movable rack to be operated so that these boards will be transferred from the stationary to the movable rack. At this time the tipple B which is under control of an operator standing on the platform 90, will generally be in its uppermost or lowermost position, its front end registering with either the top or bottom conveyor of the stationary rack. As the conveyors of the stationary rack are operated to discharge their load, a board moving along the tipple carrier will be transferred from the tipple to the particular stationary rack conveyor with which the tipple is in registration. The speed of the stationary rack conveyor is the same as that of the tipple conveyor and as one board leaves this particular stationary rack conveyor its place is taken by another board from the tipple. This operation therefore loads the movable rack and places a single board on one of the stationary rack conveyors. The handle 180 is then moved to stop all of the conveyors on the stationary and movable racks. The operator on the platform 90 then tilts the tipple B by turning the crank 86 until its carrier registers with the next stationary rack conveyor and this operator then presses the pedal 110 which serves to move the chain 98 forward engaging one of the toothed rolls 101 with the result that the next stationary rack conveyor is operated to receive the next board from the tipple. In this manner the operator on platform 90 continues to load the stationary rack conveyors in succession until they are all filled. In the meantime the loaded truck has moved away to the hydraulic press and an empty truck has taken its place in front of the stationary rack. The handle 180 is then again moved, and the stationary rack discharges into the movable rack which has in the meantime been brought into loading position.

The boards as they are fed over the table rolls 50 toward the tipple are very close together. As some time is consumed in moving the tipple from a position to feed to one stationary rack conveyor to a position to feed to the next stationary rack conveyor, provision is made for separating the boards as they move forward so as to give the operator time after one board has been fed to a stationary rack conveyor to move the tipple to a new position before the next board reaches the end of the tipple. The separation of the boards is accomplished by driving the tipple carrier 60 at a greater speed than the table rolls 50. In this manner each board as it moves on to the tipple carrier 60 is accelerated and moves some distance ahead of the board behind. It will, of course, be understood that the speed of the tipple carrier and of the stationary and movable rack conveyors are the same.

I claim:

1. The combination of a series of conveyors, mounted one over the other and each having a driving shaft at one end of the conveyor and a toothed driving wheel on said shaft, a transfer device comprising a carrier, one end of which is movable up and down so as to register with any one of said conveyors, means for driving said carrier and means for driving the conveyor with which said carrier registers, said last named means including a chain which is driven by and movable up and down with said one end of said carrier, and additional means for moving a portion of said chain so that said chain engages and drives the toothed wheel of said last named conveyor.

2. The combination of a series of conveyors mounted one over the other and each conveyor having a driving shaft at one end of the conveyor, a toothed driving wheel on said shaft, a transfer device comprising a frame, one end of which is movable up and down so as to register with any one of said conveyors, a mechanically driven carrier on said frame, and means for driving the toothed wheel of the conveyor with which a said end of said frame registers, said means including a sprocket wheel mounted on said frame and driven from said carrier, a chain driven from said sprocket wheel, a chain guide mounted on said frame and movable relative thereto and means for moving said guide so that said chain is moved into or out of engagement with said last named toothed wheel.

3. The combination of a series of conveyors mounted one over the other and each conveyor having a driving shaft at one end of the conveyor, a toothed driving wheel on said shaft, a transfer device comprising a frame, one end of which is movable up and down so as to register with any one of said conveyors, a mechanically driven carrier on said frame, and means for driving the toothed wheel of the conveyor with which said end of said frame registers, said means including a sprocket wheel mounted on said frame and driven from said carrier, a support mounted on said frame and movable relative thereto, chain guiding rolls mounted on said support and means for moving said support so that said rolls will cause said chain to be moved into or out of engagement with said last named toothed wheel.

4. A means for driving any one of a plurality of superposed conveyors, having individual driving wheels located one above the other, said means consisting of a support which is movable up and down to positions adjacent each of said wheels, a frame mounted on said support and slidable thereon, toward and away from said driving wheels, a chain guide mounted on said support, a sprocket wheel rotatably mounted on said support, driving means for said sprocket wheel on said support and an endless chain carried by said sprocket wheel and guide, said chain being of a length sufficient to permit the guide to move toward said driving wheels, the parts being so constructed that on forward movement of said frame said chain engages and drives one of said driving wheels.

5. A rack having a series of conveyors thereon, one above the other, a series of parallel conveyor driving shafts at one end of said rack, sprocket wheels on said shafts located in a single plane and means for driving all of said sprocket wheels simultaneously, said means consisting of an endless chain, means for driving said chain, and means for moving said chain into and out of engagement with said sprocket wheels.

6. A rack having a series of conveyors thereon, one above the other, a series of parallel conveyor driving shafts at one end of said rack, sprocket wheels on said shafts located in a single plane, an endless chain for driving all of said sprocket wheels, a chain guide formed of a bar having a chain engaging portion extending along said bar and means for moving said guide toward and away from said sprocket wheels so as to cause said chain to engage and disengage said sprocket wheels, and means for driving said chain.

7. A rack having a series of conveyors thereon, one above the other, a series of parallel conveyor driving shafts at one end of said rack, sprocket wheels on said shafts located in a single plane, an endless chain for driving all of said sprocket wheels, a chain guide formed of a bar having a chain engaging portion extending along said bar and means for moving said guide toward and away from said sprocket wheels so as to cause said chain to engage and disengage said sprocket wheels, said means consisting of a system of toggles connected at one end to said bar at different points along its length and at the other end to said rack, and means for driving said chain.

8. In an article handling system, the combination of a support, a series of conveyors mounted thereon in parallel superposed relation, a transfer device comprising a frame pivotally supported at one end and movable about its support to bring its free end into and out of registry with each of said conveyors, means on said frame for conveying material along the same to its free end, and constantly running means on said frame for driving any of said conveyors when engaged therewith, and means movable with respect to said frame for making such engagement when the free end of the frame is in registry with the particular conveyor.

9. The combination of claim 8 in which the driving means on the pivotal frame and the means for conveying material along the frame are geared together.

10. The combination of claim 8 in which the driving means on the pivotal frame is a driven endless chain.

11. The combination of claim 8 in which a single control means is provided to simultaneously operate the superposed conveyors when disconnected from the driving means of the pivotal frame.

12. The combination of claim 8 in which the means for making engagement between the conveyor on the transfer device and any conveyor of the series in the support is mounted on the swinging end of the frame.

13. The combination of a series of parallel conveyors spaced one over the other, a drive-transmitting member operatively connected with each of said conveyors, a carrier for feeding articles onto said conveyors, said carrier being pivoted on a horizontal axis at its far end, and its near end being selectively movable to positions opposite any one of said conveyors, a drive member mounted on and movable with said carrier, and also movable with respect thereto to engage the drive surface for the conveyor which the carrier is then opposite, said drive member being so connected with a drive source as to drive the conveyors in the same direction as that in which the carrier feeds.

WILLIAM H. MASON.